(No Model.)
P. H. ADAMS.
WINDMILL.
No. 506,026.
Patented Oct. 3, 1893.
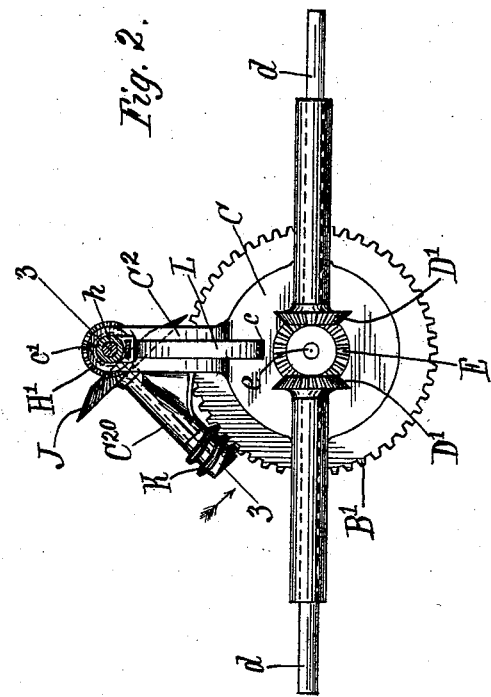
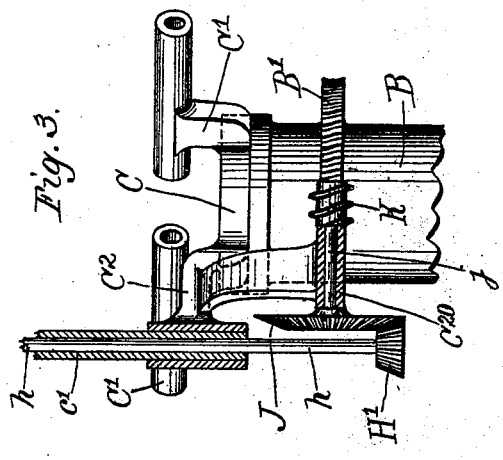
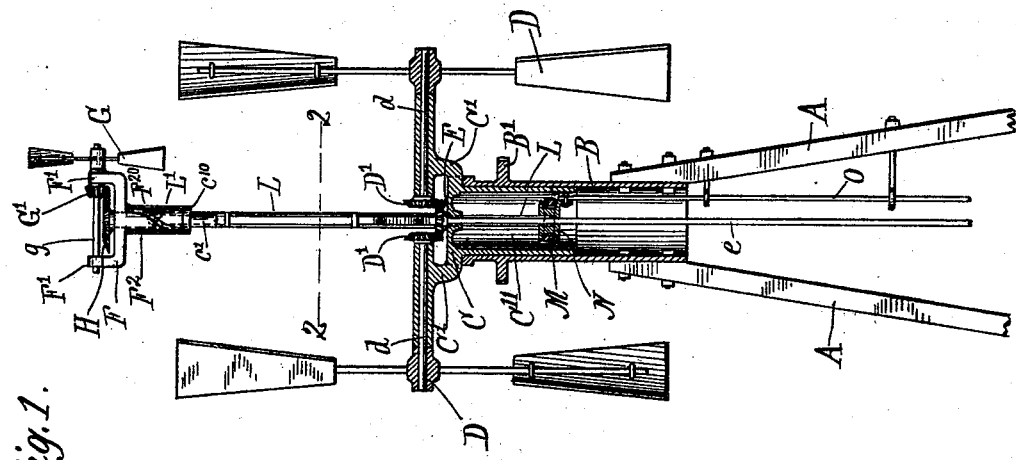
Witnesses.
E. T. Wray.
Inventor
Phineas H. Adams
By Burton and Burton
his Attys.

UNITED STATES PATENT OFFICE.

PHINEAS H. ADAMS, OF MONTROSE, ASSIGNOR TO LA VERNE W. NOYES, OF CHICAGO, ILLINOIS.

WINDMILL.

SPECIFICATION forming part of Letters Patent No. 506,026, dated October 3, 1893.

Application filed November 11, 1892. Serial No. 451,697. (No model.)

*To all whom it may concern:*

Be it known that I, PHINEAS H. ADAMS, a citizen of the United States, residing at Montrose, county of Cook and State of Illinois, have invented certain new and useful Improvements in Windmills, which are fully set forth in the following specification, reference being had to the accompanying drawings, forming a part thereof In the drawings, Figure 1 is a partly sectional side elevation of my improved windmill. Fig. 2 is a section at the line 2—2 on Fig. 1. Fig. 3 is a section at the line 3—3 on Fig. 2.

A A are timbers of the tower.

B is a cap or thimble binding the timbers together at the top, and constituting the immediate support for the turn-table C. The turn-table comprises a hollow stem or sleeve $C^{11}$, which extends down within the cap or thimble B of the tower to afford to the turn-table suitable guidance as it is adapted to rotate about its vertical axis on the tower top.

C' C' are upright bracket arms of the turn-table, in which are journaled the shafts $d\ d$ of two main wheels D D, at the inner ends of which, between the bracket arms C' C', are secured equal beveled gears D' D', facing each other and meshing with the beveled gear E, which is fixed upon the upper end of the vertical shaft $e$, which is journaled at the center of the turn-table and tower-top, and extends downward to communicate power to the mechanism below.

One of the wheels D is a right-hand and the other a left hand wheel, so that the same wind blowing through them revolves them in opposite directions, causing them to communicate the same motion to the vertical shaft $e$. The turn-table C has further a rigid bracket arm $C^2$ extending out at right angles to the arms C' C', and having as a rigid bracket or continuation of it at the outer end, the vertical pipe $c'$, which may be treated as a part of the bracket arm, since it is made rigid with the latter. This pipe $c'$ extends up to a point higher than the upper margin of the main wheels D D, and upon its upper end there is supported the yoke or bracket F, which is adapted to turn about the vertical axis of the pipe, and is downwardly stopped by a collar $c^{10}$ on the pipe. This bracket F has the horizontal bearings F' F' for the shaft $g$ of the governor wheel G, on which, between said bearings, there is made fast a beveled pinion G', which meshes with the beveled gear H, which is pinned fast to the upper end of the shaft $h$, which is journaled in the bracket F, and extends down through the pipe $c'$, emerging from the lower end of the latter, where it is provided with the beveled pinion H' rigid with it and meshing with and driving the beveled gear J, having its shaft $j$ journaled in a bearing $C^{20}$ extended off from the bracket arm $C^2$ of the tower top. At the opposite end of said bearing $C^{20}$, from the beveled gear J, the shaft $j$ carries rigid with it the worm K, which meshes with the worm gear rim or flange B', which is formed upon or rigid with the cap or tower top B at the upper margin thereof. The hub $F^2$ of the yoke or bracket F, which, as stated, is loose upon the upper end of the pipe $c'$, has the spiral slot $F^{20}$, and a flat bar L, which is mounted on the pipe $c'$ in guides which permit it to slide longitudinally on the pipe, but not to move otherwise relatively to the latter, has, near its upper end, a stud pin L', which takes into the spiral or oblique slot $F^{20}$. The extent of this slot is such that the longitudinal movement of the bar L, carrying its stud pin L' through the whole length of the slot, will rotate the hub $F^2$ and the entire bracket F through ninety degrees about the axis of the pipe $c'$, such rotation being permitted by the fact that the beveled gear H is concentric with the pipe, so that the beveled gear G', which meshes with it in such rotation of the bracket, travels around the gear H. Toward the lower end of the pipe $c'$, at a distance a little above the tower top, the bar L is set off toward the center of the tower, and extends down through the center of the slot $c$ in the web of the turn-table, outside of the circumference of the beveled gear E; and a little below the top of the tower top, it is bolted fast to a ring M, which encircles a collar N, properly flanged to retain it, said collar being fitted loosely on the shaft $e$, so that it may slide on the latter, and so that the latter may revolve freely within it without hinderance on account of the presence of the collar. From the collar N, a rod O extends down, being suitably guided at any convenient points on the tower, and at the lower end is designed to be within reach of the operator, who, by pulling down or pushing up the rod, will slide the bar L up or down, and swing the bracket F more or less in either direction from the position in which the governor wheel is as right angles to the plane of the main wheels, toward or to a position at which it is parallel with said wheels. Suitable means may be provided for securing the rod O at any position to which it may be moved vertically, and thereby securing the governor wheel at any angle to which it may be set, or in a position parallel with the main wheels.

The advantages of this structure are the exposure of the governor wheel at a position where it neither obstructs the wind for the main wheels, nor is itself shielded by the latter from the wind, so that it, at all times, experiences the action of the wind independently of the main wheels according to its own angle to the wind.

The operation of the construction will be understood to be that when the governor wheel is set parallel with the main wheels, the wind rising from such a quarter as to strike the governor wheel at an angle tending to rotate it, such rotation will cause the tower top to rotate about its axis until the governor wheel stands edgewise to the wind, and until, therefore, the main wheels are edgewise to the wind or "out of wind." When the governor wheel is set at right angles to the main wheels, the wind being in or rising from any quarter which will tend to rotate the governor wheel, will cause it to rotate the turn-table until the governor wheel is again edgewise to the wind, in which position the main wheels will face the wind and receive its full force. For the purpose of making the governor wheel hold the main wheels in wind, therefore, it will be set at right angles to the latter, and, for the purpose of holding them out of wind, it will be set parallel to the latter, and for the purpose of holding them oblique to the wind at such angle as may be desired to cause them to experience a fraction of the wind's effect, the governor wheel will be set at the same angle to the main wheel.

I claim—

1. In combination with the tower top and the turn-table having the windmill journaled upon it, the steering wheel having its supporting frame pivoted vertically on the turn-table and adjustable in a horizontal plane about such pivot, and a power-transmitting train extending from the steering wheel shaft through the pivotal connection of the steering wheel frame to the turn-table and thence to the tower top; whereby the steering wheel is geared to the tower top with capacity for change of its plane of rotation without disconnecting said gear train and independently of the operation thereof: substantially as set forth.

2. In combination with a tower top and the turn-table having the wind-wheel journaled upon it, the steering wheel having the frame in which it is journaled pivoted vertically on the turn-table, such pivotal axis being in the vertical plane of the axis of the steering wheel; suitable means for adjusting the frame horizontally about such pivot, and a gearing train from the steering wheel to the tower top, substantially as set forth.

3. In combination with the tower top and the turn-table having the wind-wheel journaled thereon, the steering wheel having the frame in which it is journaled pivoted vertically on the turn-table at a line in the vertical plane of the axis of the steering wheel and adjustable horizontally about such pivot, and a power-transmitting train extending from the steering wheel shaft through such vertical pivotal connection of the steering wheel frame to the turn-table, and thence to the tower top: substantially as and for the purpose set forth.

In testimony whereof I have hereunto set my hand, in the presence of two witnesses, at Chicago, Illinois, this 28th day of October, 1892.

PHINEAS H. ADAMS.

Witnesses:
D. E. BARNARD,
CHAS. S. BURTON.